United States Patent
Lynn et al.

(10) Patent No.: US 10,704,571 B2
(45) Date of Patent: *Jul. 7, 2020

(54) POPPET VALVE SYSTEM AND METHOD

(71) Applicant: Other Lab, LLC, San Francisco, CA (US)

(72) Inventors: Pete Lynn, Oakland, CA (US); Kevin Albert, San Francisco, CA (US); Giancarlo Nucci, San Francisco, CA (US); Tim Swift, Clovis, CA (US); Maria Telleria, Redwood City, CA (US); Loren Russell, Berkeley, CA (US); Jonathan Pompa, Long Beach, CA (US)

(73) Assignee: OTHER LAB, LLC, San Francisco, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/997,337

(22) Filed: Jun. 4, 2018

(65) Prior Publication Data

US 2018/0283414 A1  Oct. 4, 2018

Related U.S. Application Data

(63) Continuation of application No. 15/083,015, filed on Mar. 28, 2016, now Pat. No. 9,995,321.

(60) Provisional application No. 62/139,192, filed on Mar. 27, 2015.

(51) Int. Cl.
*F15B 15/10* (2006.01)
*F16K 17/04* (2006.01)
(Continued)

(52) U.S. Cl.
CPC .............. *F15B 15/103* (2013.01); *B25J 9/142* (2013.01); *F16K 17/048* (2013.01); *F16K 17/06* (2013.01);
(Continued)

(58) Field of Classification Search
CPC .......... B25J 9/142; F16K 41/12; F16K 41/10; F15B 15/202
(Continued)

(56) References Cited

U.S. PATENT DOCUMENTS 3,526,223 A   9/1970  Curtis
3,534,407 A   10/1970 Barthlome
(Continued)

FOREIGN PATENT DOCUMENTS

CN       1171511 A    1/1998
CN     101961261 A    2/2011
(Continued)

OTHER PUBLICATIONS

Davis et. al., pneumatic Muscle Actuators for Humanoid applications—Sensor and Valve Integration, Humanoids (2006), p. 456-561.*
(Continued)

*Primary Examiner* — Michael Leslie
*Assistant Examiner* — Daniel S Collins
(74) *Attorney, Agent, or Firm* — Davis Wright Tremaine LLP

(57) ABSTRACT

A poppet valve system that includes a valve body having a first and second end and defining a valve cavity and a poppet assembly extending from the first end to the second end and through the valve cavity. The poppet assembly can include a movable poppet head disposed at the first end of the poppet assembly and configured generate a seal by contacting a portion of the valve body and configured to define an opening between the valve cavity and a pressure cavity. The poppet assembly can also include a movable guiding element disposed at the second end of the valve body and a shaft extending from the first end to the second end and coupled to the poppet head and guiding element.

19 Claims, 8 Drawing Sheets

(51) Int. Cl.
*F16K 17/06* (2006.01)
*F16K 31/06* (2006.01)
*B25J 9/14* (2006.01)
*F15B 15/20* (2006.01)

(52) U.S. Cl.
CPC ........ *F16K 31/0693* (2013.01); *F15B 15/202* (2013.01)

(58) Field of Classification Search
USPC .......................................................... 91/433
See application file for complete search history.

(56) References Cited

U.S. PATENT DOCUMENTS

| | | |
|---|---|---|
| 4,218,997 A | 8/1980 | Hunt |
| 2006/0174761 A1 | 8/2006 | Asai et al. |

FOREIGN PATENT DOCUMENTS

| | | |
|---|---|---|
| CN | 103252767 A | 8/2013 |
| DE | 29517768 U1 | 3/1997 |
| EP | 0236764 A1 | 9/1987 |
| JP | 2013217494 A | 10/2013 |
| RU | 137074 U1 | 1/2014 |
| WO | 02051339 A2 | 7/2002 |
| WO | 2005021980 A1 | 3/2005 |

OTHER PUBLICATIONS

Zhang et. al, Pressurized Artifical Muscles, Journal of Intelligent Material Systems, 23(3) 255-268 (2011).*
International Search Report and Written Opinion dated Sep. 8, 2016, International Patent Application No. PCT/US2016/024386, filed Mar. 26, 2016.

* cited by examiner

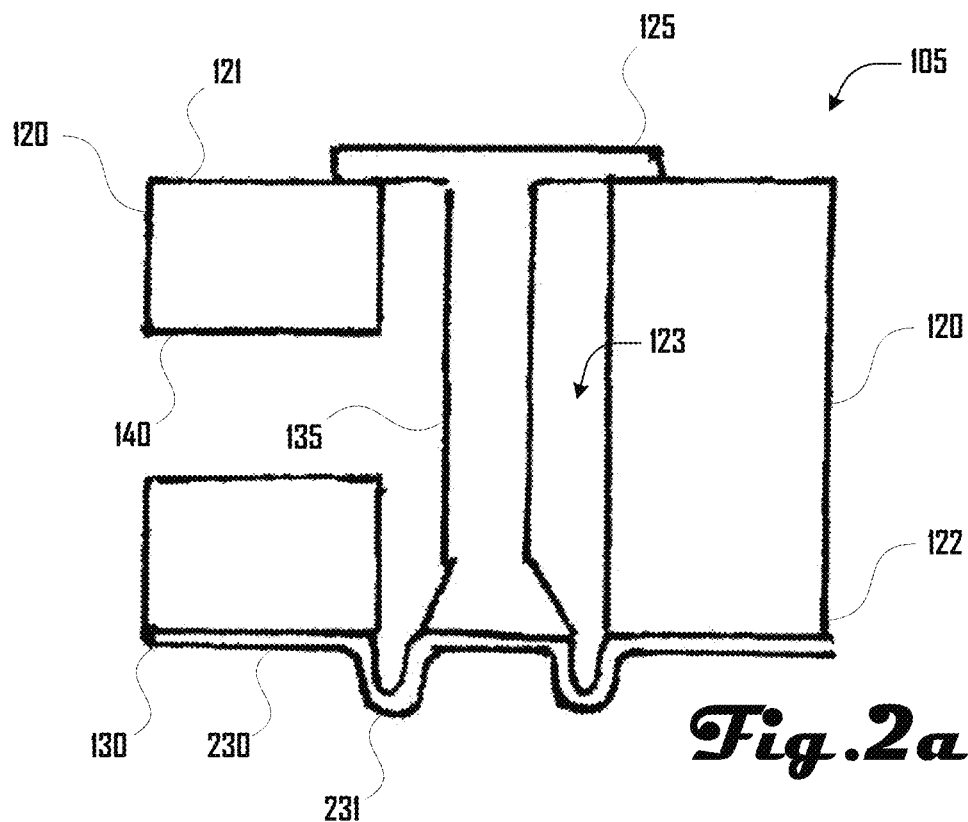
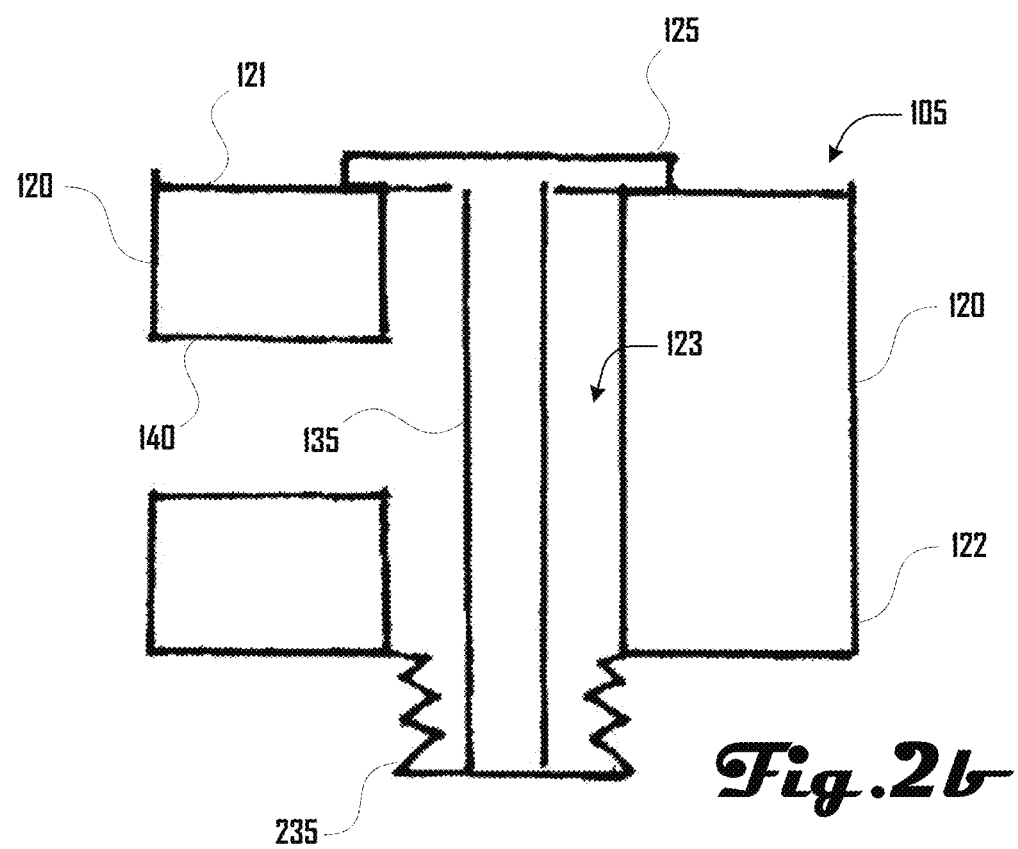

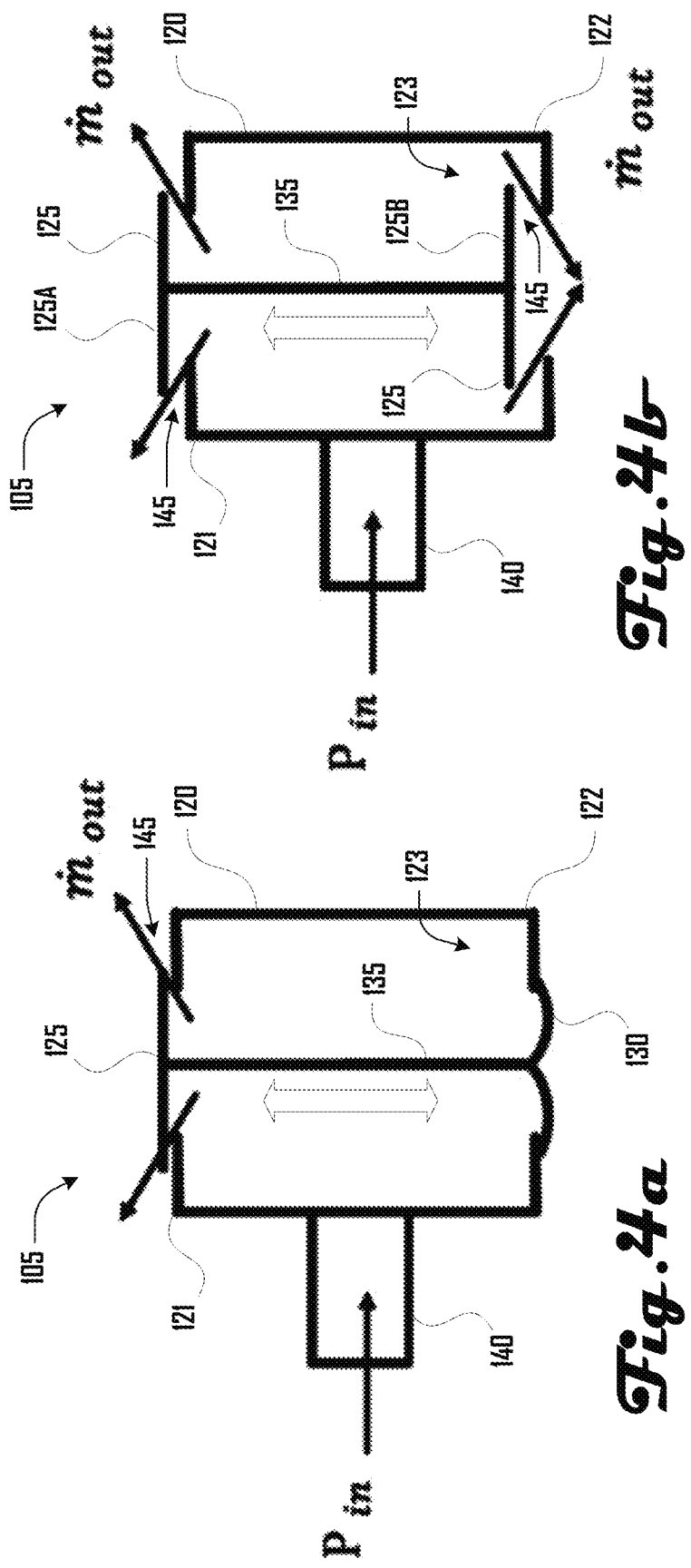

POPPET VALVE SYSTEM AND METHOD

CROSS-REFERENCE TO RELATED APPLICATIONS

This application is a continuation of U.S. application Ser. No. 15/083,015 filed Mar. 28, 2016, which is a non-provisional of and claims the benefit of U.S. Provisional Application No. 62/139,192 filed Mar. 27, 2015, which applications are hereby incorporated herein by reference in their entirety and for all purposes.

GOVERNMENT RIGHTS

This invention was made with government support under SOCOM-H9222-15-C-0017 awarded by the United States Special Operations Command, and NASA-NNX14CA56P and NNX15CA22C awarded by National Aeronautics and Space Administration. The government has certain rights in the invention.

BACKGROUND

Conventional valves are not well suited for applications where size and weight is a factor. For example, in pneumatic orthotics, robotics and exoskeleton-type applications, the weight of numerous large and heavy valves can substantially add to the weight of the total device and can be one of the heaviest portions of such a device. Additionally, large and bulky conventional valves impede mobility, which is undesirable for users of such devices.

Conventional pneumatic systems in such applications often have valves that are far from an actuating chamber and connected by a series of tubes. Such a configuration can be undesirable, because in addition to the additional bulk and weight of such tubing, the distance between the valve and pneumatic actuator can generate an undesirable lag between when a change is commanded and when the pressure is affected in a pneumatic actuator.

In view of the foregoing, a need exists for an improved poppet valve system and method in an effort to overcome the aforementioned obstacles and deficiencies of conventional valve systems, including in the field of fluidic robotics, pneumatic orthotics and robotic exoskeletons.

BRIEF DESCRIPTION OF THE DRAWINGS

FIG. 2a illustrates an example embodiment of a valve assembly that includes a rolling diaphragm.

FIG. 2b illustrates another example embodiment of a valve assembly that includes a bellows.

FIG. 4a illustrates a poppet assembly that comprises a poppet head and diaphragm coupled to a shaft.

FIG. 4b illustrates a poppet assembly that comprises a first and second poppet head coupled to a shaft.

Figure 1:
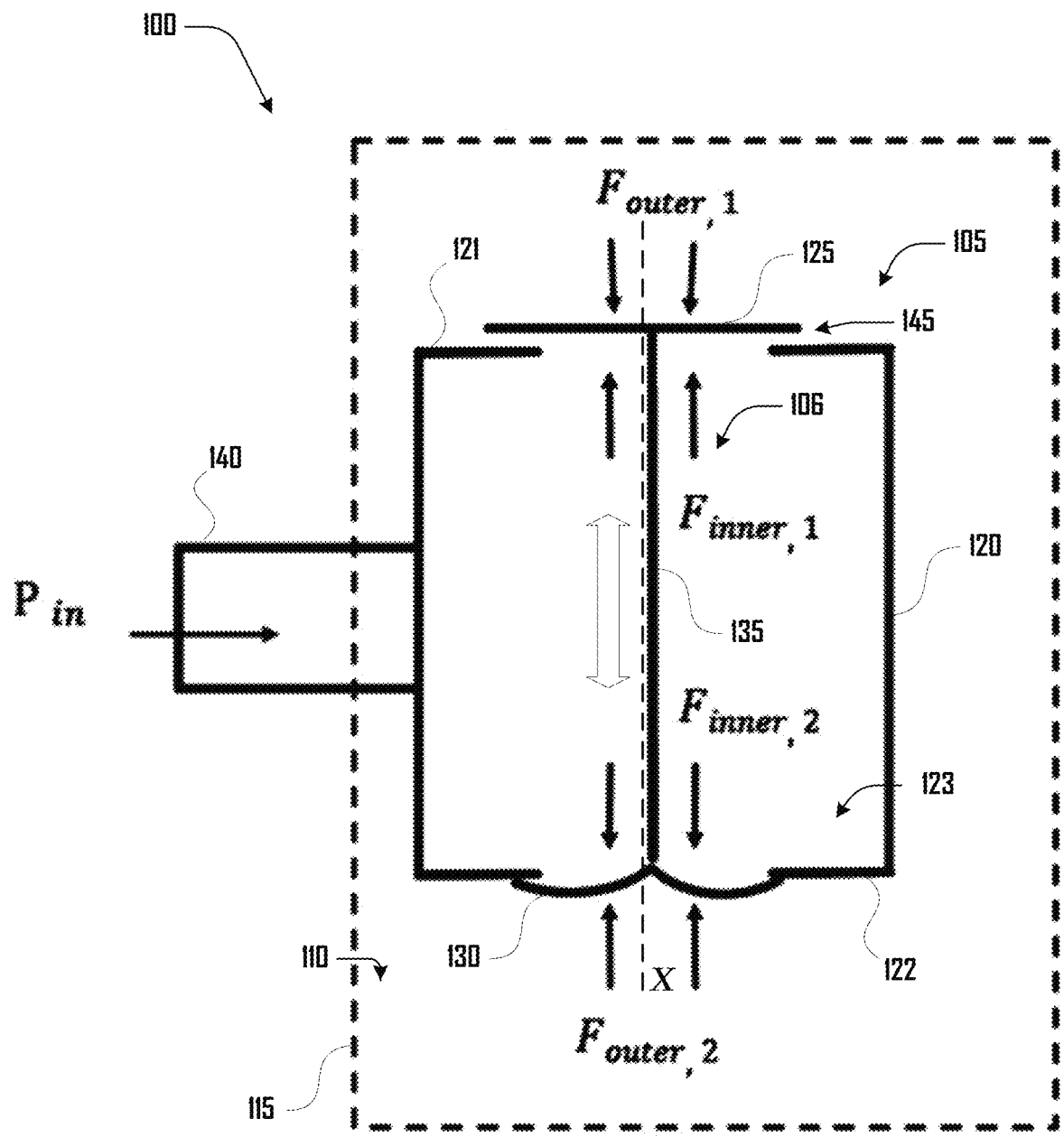
FIG. 1 is an exemplary block diagram illustrating an embodiment of a poppet valve system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure teaches example embodiments of a novel high-speed valve that uses a balanced poppet configuration. Various embodiments provide a reduction in required operating forces when compared with conventional proportional valves through the use of a diaphragm, bellow, or other sealed guiding mechanism which eliminates the pressure imbalances on the poppet. Some embodiments discussed herein can introduce improvements versus conventional balanced poppet valves, including lower cost, smaller size, bi-directional flow, faster actuation for comparable flow rates and pressure ranges, and the like.

By using mass manufacture techniques such as injection molding, it is possible in some embodiments to lower part count and cost while maintaining high performance. For example, by ensuring that the valve's flow path passes over the actuator, cooling of the actuator can be obtained in some embodiments which can allow the actuator to be driven with more power without overheating. By protecting the actuator within the valve body, the valve can be made significantly more durable in some embodiments, and becomes appropriate for external mounting.

Internal actuator mounting can also allow for the removal of sliding seals, lowering the actuation force. For example, in some embodiments, the valve may also include integrated position and pressure sensing to provide feedback on the flow through the valve. One example embodiment discussed herein can be configured to regulate air flow, but this should not be construed to limit the applicability of such embodiments. Various embodiments can be used with any suitable fluid (e.g., water, oil, air, helium, and the like) and can be configured to operate using a variety of balancing methods, poppet seals, actuators, and construction architectures. These alternate embodiments can also include dynamic adjustability of various valve properties (e.g., as pressure balance, and the like) through the use of variable geometry or smart materials.

Various embodiments described and shown herein can be configured to provide an improvement over conventional poppet valves, including a valve that is less expensive, more durable, and/or smaller than conventional poppet valves. Additionally various example embodiments discussed herein include exposing both ends of a valve poppet to the inlet and outlet pressures which can allow the poppet to see a net force of zero if the areas exposed to pressure are matched appropriately. One way of achieving this is to seal a bottom (non-flow) end of the poppet to a compliant diaphragm, so that the effective pressure area can be held constant throughout the poppet's stroke. Placing the actuator within the sealed valve body protects the actuator, and removes the need for a high friction sliding seal.

Additionally in example embodiments where the actuator is placed within the sealed valve body, the flow through the valve can be directed over the actuator. Such a design can provide improved cooling versus a traditional balanced poppet. In accordance with various embodiments, these improvements can allow for a smaller actuator, and thus a smaller assembly. Using mass manufacture techniques such as injection molding and ultrasonic welding can allow for the consolidation of many key parts and interfaces, leading to a simpler, less expensive assembly.

Turning to FIG. 1, an example embodiment of a balanced poppet valve system 100 is shown as comprising a valve assembly 105 disposed within a first pressurized cavity 110 defined by a pressure vessel 115. The valve assembly 105 comprises a valve body 120 and a poppet assembly 106 that includes a poppet head 125 disposed at a first end 121 of the valve body 120 and a diaphragm 130 disposed at a second end 122. The valve body 120 defines a second valve cavity 123, in which a shaft 135 extends from the first end 121 to the second end 122 along axis X and couples the poppet head 125 and the diaphragm 130.

A channel 140 is coupled with the valve body 120 and operably communicates with the valve cavity 123 and extends through the pressurized cavity 110 defined by the pressure vessel 115 to the outside of the pressure vessel 115. In various embodiments, the channel 140 is configured to allow fluid to pass into and/or out of the valve cavity 123.

As illustrated in FIG. 1, the shaft 135 can be configured to move along axis X, which extends the poppet head 125 away from the valve body 120 to create an opening 145 between the poppet head 125 and the valve body 120, which can allow fluid to pass to or from or between, the pressurized cavity 110 and the valve cavity 123. The diaphragm 130 can bend, deform, extend, roll, or otherwise move along axis X.

The movement of the poppet head 125 and the resulting changes in pressure can generate changes in the various forces acting on the poppet assembly 106 within the valve cavity 123 and the pressure vessel 115. For example, valve cavity forces $F_{inner,1}$ and $F_{inner,2}$ can act on the poppet head 120 and diaphragm 130. Additionally, pressurized cavity forces $F_{outer,1}$ and $F_{outer,2}$ can also act on the poppet head 120 and diaphragm 130. Additionally, as discussed herein, the poppet head 120 can be biased by the diaphragm 130 or by other mechanism such as a spring associated with the shaft 135, or the like.

Such pressures can be any suitable pressure including a vacuum, a pressure below atmospheric pressure, a pressure at atmospheric pressure or a pressure above atmospheric pressure. Additionally, in some states or configurations, the valve cavity 123 and pressure vessel 115 can have the same pressure. In some states or configurations, a pressure of the valve cavity 123 can be less than the pressure within pressure vessel 115, but in some states or configurations, a pressure of the valve cavity 123 can be greater than the pressure within pressure vessel 115.

In some embodiments, to achieve a balanced poppet design, the diaphragm 130 (or other guiding component) and the back of the poppet head 125 must be exposed to the same pressure. Embodiments to achieve this balanced architecture include exposing both ends to atmosphere, placing the valve inside of the pressure chamber that it is controlling, or in a sealed body embodiment by creating a vent path between the two zones.

A balanced valve configuration can achieved by matching the effective cross-sectional areas of the poppet head 125 and diaphragm 130 (or other guiding element), such that the pressure inside the valve cavity 123 applies the same force on the poppet head 125 as on the diaphragm 130, balancing the force on the poppet assembly 106 due to the valve cavity pressure. Similarly, the matching cross-sectional areas can result in a near-zero net force on the poppet assembly 106 due to the pressure in the pressurized cavity 123.

In other words, the pressure acting on the inside faces of the diaphragm 130 and poppet head 125 exerts the same force on the poppet head 125 as the diaphragm end 130 resulting in a net zero force on the poppet assembly 106. Similarly the pressure acting on outside faces of the poppet head 125 and outside faces of the diaphragm 130 exert nearly the same force on the poppet assembly 106 in opposite directions resulting in a net zero force.

Although various examples discussed herein include air as a fluid being used with a poppet valve system 100, in further embodiment any suitable fluid can be used with a poppet valve system 100 including water, oil, air, helium, and the like. Similarly, such a poppet valve system 100 can be configured to operate in various external operating environments under water, in a vacuum, in atmosphere, or the like.

Figure 5A:
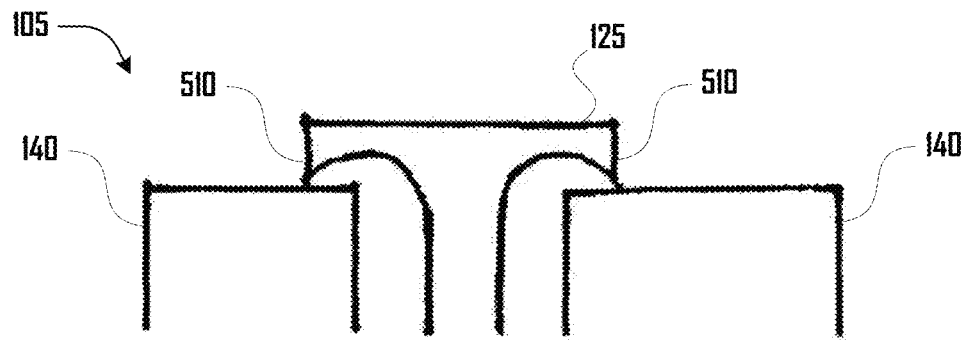
FIG. 5a illustrates an example embodiment having a knife edge seal generated by a knife edge on a poppet head.
Figure 5B:
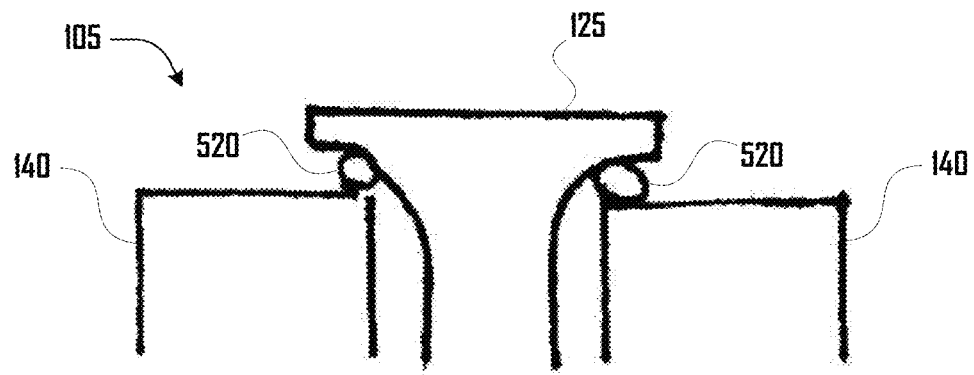
FIG. 5b illustrates an example embodiment having an O-ring seal.
Figure 5C:
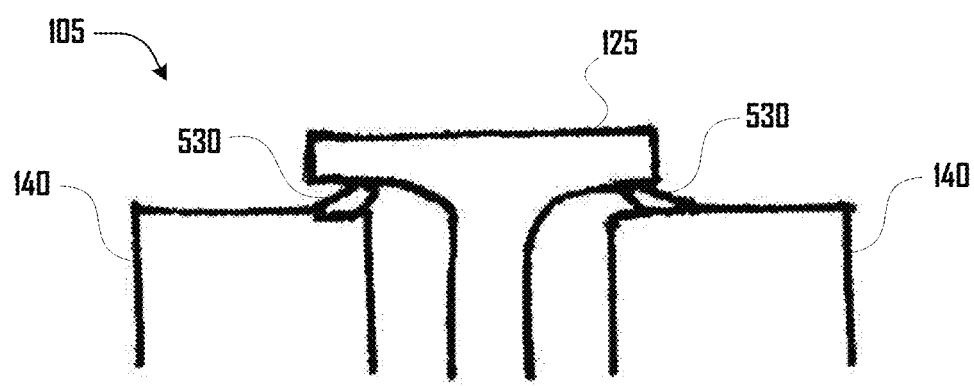
FIG. 5c illustrates an example embodiment having a wiper seal.

The poppet head 125 and engagement with the valve body 120 can be configured to provide a seal that prevents or resists air from moving between the valve cavity 123 and pressure vessel 115. As discussed in more detail below, such a seal can be generated in any suitable way. For example, FIG. 5a illustrates an example embodiment having a knife edge seal generated by a knife edge 510 on the poppet head 125. FIG. 5b illustrates an example embodiment having an O-ring seal generated by an O-ring 520 which can be coupled to the valve body 120 or the poppet head 125. FIG. 5c illustrates an example embodiment having a wiper seal generated by a wiper 530 which can be coupled to the valve body 120 or the poppet head 125.

In various embodiments, various portions of the valve body 120, poppet head 125, and the like, can be co-molded. For example, a material such as a plastic, elastomer, or the like, can cover, extend from, define part of, or otherwise be integrally associated with the valve body 120, poppet head 125, or the like. In such embodiments, a co-molded portion of the valve body 120 and/or poppet head 125 can define a portion of a seal or coupling between the valve body 120 and poppet head 125. For example, in some embodiments, structures such as a knife edge 510, O-ring 520, wiper 530, and/or poppet coupling surface of the valve body 120 can comprise a co-molded portion.

Although FIG. 1 illustrates a diaphragm 130 communicating with the poppet head 125 via a poppet shaft 135, in further embodiments any suitable alternative guiding mechanism can be used in place of or in addition to the diaphragm 130. For example, such a mechanism can include a flexible diaphragm, rolling diaphragm, bellows or another guiding mechanism that allows the valve to open and close while remaining sealed on the shaft 135 end, or the like. FIG. 2a illustrates one example embodiment of a valve assembly 105 that includes a rolling diaphragm 230 coupled to the shaft 135 and opposing the poppet head 125. FIG. 2b illustrates another example embodiment of a valve assembly 105 that includes a bellows 235 coupled to the shaft 135 and opposing the poppet head 125.

Additionally, in some embodiments, the poppet head 125 and a guiding mechanism such as a diaphragm 130 can be linked in any suitable way. For example, although a shaft 135 is illustrated as one example of a method of coupling or linking a poppet head 125 and diaphragm 130, in further embodiments, other suitable coupling or linking mechanisms can be employed. For example, a rotary actuator can link a poppet head 125 and diaphragm 130 in one embodiment. In further embodiments, the poppet assembly 106, including the poppet head 125 and diaphragm 130 need not be linearly disposed, and can instead be disposed in any suitable relationship including perpendicularly or at another suitable angle. In other words, a first and second end 121, 122 of the valve body 120 need not be parallel and/or opposing in some embodiments.

Figure 3A:
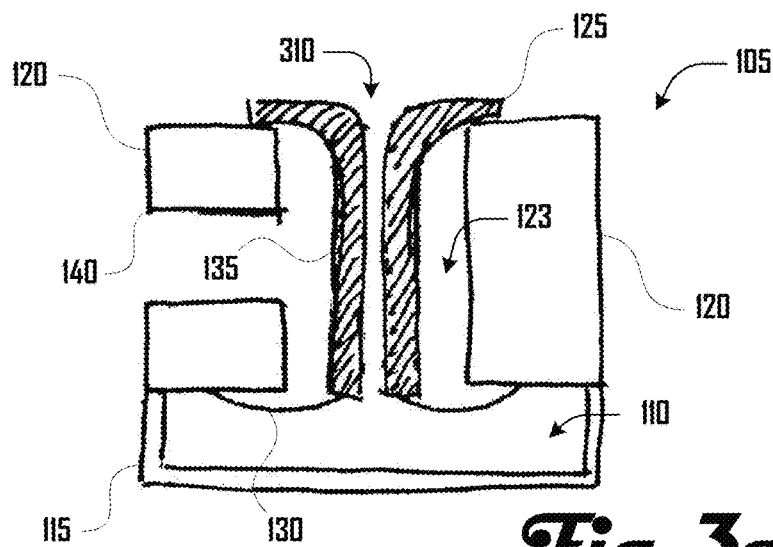
FIG. 3a illustrates one example embodiment wherein venting can occur through a poppet channel.
Figure 3B:
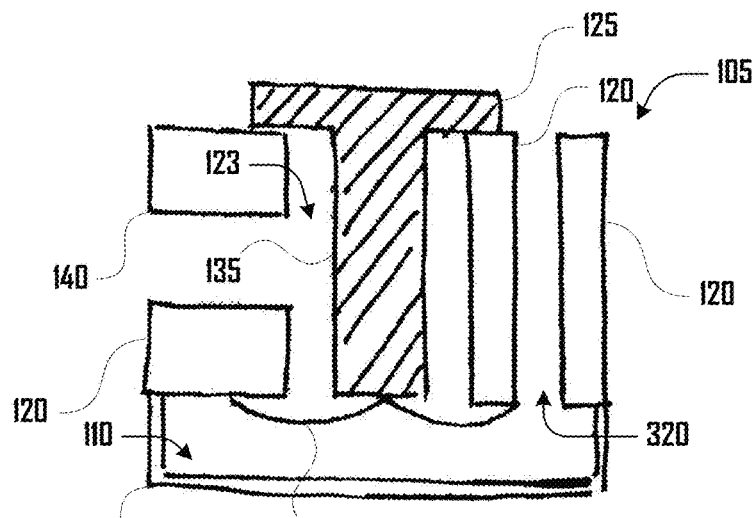
FIG. 3b illustrates another example embodiment wherein venting can occur through a valve body channel.
Figure 3C:
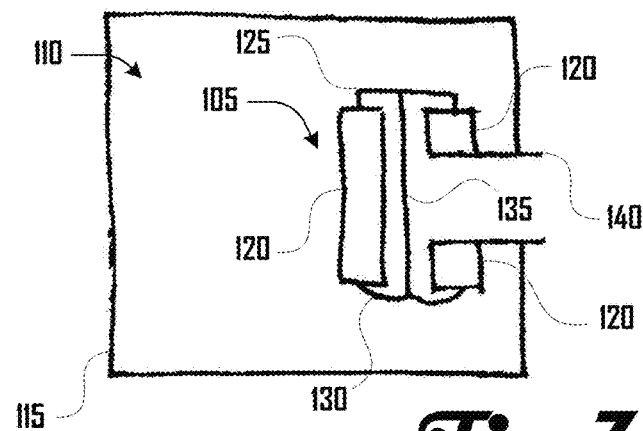
FIG. 3c illustrates another example embodiment wherein a valve assembly is disposed inside the pressure chamber that the valve assembly acts upon.

Venting or otherwise balancing the pressure between the top and bottom end 121, 122 within the pressure chamber 110 can be done in any suitable way including though open communications within the chamber 110 as illustrated in FIG. 1, though the poppet head 125, via the valve body 120, or the like. For example, FIG. 3a illustrates one example embodiment wherein venting can occur through a poppet channel 310 that extends between the top and bottom end 121, 122 from the poppet head 125 to the diaphragm 130 and can be defined by the poppet head 125, shaft 135 and/or diaphragm 130. FIG. 3b illustrates another example embodiment wherein venting can occur through a valve body channel 320 that extends between the top and bottom end 121, 122 and is defined by portions of the valve body 120. FIG. 3c illustrates another example embodiment wherein the valve assembly 105 is disposed within the pressure chamber 110 that the valve assembly 105 acts upon.

In various embodiments, the poppet head 125 and/or shaft 135 can be designed to be as light as possible, and can be profiled to help control the flow exiting the valve assembly 105. For example, in some embodiments, the shape beneath the poppet head 125 can be used to help control the choke point in the flow path through the valve assembly 105. In some embodiments, the poppet assembly 106 can have additional aerodynamic profiling above the poppet head 125 to reduce flow losses, and improve balancing.

In some embodiments, high-speed operation of the valve assembly 105 can be facilitated by designing the opening 145 between the poppet head 125 and the valve body 120 to have a large cross sectional area. Such embodiments can enable high flow rates with a short-stroke operation. A small linear motion of the poppet head 125 can create a large flow path area at the opening 145. For a given actuator, reducing the stroke of the valve assembly 105 can increase actuation speed by decreasing travel distance. Accordingly, various configurations of a balanced poppet system 100 can enable the use of a larger cross sectional opening 145 because the actuation force is independent of the cross sectional area.

One preferred embodiment of the diaphragm 130 comprises a roll sock 230 as illustrated in FIG. 2a, which can comprise extra material that forms a bulge 231 or convolution in between the valve body 120 and the poppet shaft 135 with a portion of the roll sock 230 coupled to the valve body 120 and the bottom of the poppet shaft 135. Such an embodiment can prevent the peak point on this bulge 231 or convolution from shifting throughout the stroke of the poppet 125 so that the effective pressure radius (and thus the balancing pressure area) of the diaphragm 130 stays constant as the poppet 125 moves up and down. However, if desired, the shape of the diaphragm 130 can be configured so that the diaphragm 130 creates a targeted imbalance, or a non-linear shift in balancing force, as the valve assembly 105 moves through its stroke. This may be desirable in some embodiments as a means to achieve open-loop control of the balanced poppet valve system 100.

In various embodiments, it can be beneficial to design a constantly balanced poppet valve system 100 with a compliant or rolling diaphragm 130 that provides for such constant balance without failing due to the mechanical load of pressurized fluid in the balanced poppet valve system 100. To accomplish this, in some embodiments, the diaphragm 130 can comprise an air-tight elastomer and can be thickened to the point that stresses do not exceed the tensile strength of the material when exposed to the maximum operating pressure.

Further embodiments comprise reinforcing the diaphragm 130 with high-strength polymers, fibers or metal that will apply negligible axial force resisting the motion of the poppet 125, but will prevent the diaphragm 130 from failing radially at higher pressures that can put large tensile loads on the diaphragm 130. In one embodiment, such a diaphragm 130 can be molded into the valve body 120, which can simplify assembly of the balanced poppet valve system 100 and improve dimensional control. A further embodiment for sealing the second end 122 of the valve assembly 105 can include a bellows 235 instead of a diaphragm 130 as illustrated in FIG. 2b.

Although various example embodiments illustrate a balanced poppet valve system 100 having a single poppet head 125, poppet shaft 135, diaphragm 130, and the like, further embodiments can include any disclosed element in a plurality or such elements can be absent. For example, some embodiments can comprise two or more poppet assemblies 106 having a respective poppet head 125, poppet shaft 135 and diaphragm 130.

Further embodiments can include a valve assembly 105 with two or more sealing surfaces that are connected to the same shaft 135 and seal on opposite ends of the valve body 120. Such embodiments can eliminate the need for a diaphragm 130 or guiding element. For example, FIG. 4a illustrates a poppet assembly 106 that comprises a poppet head 125 and diaphragm 130 coupled to a shaft 135. In contrast, FIG. 4b illustrates a poppet assembly 106 that comprises a first and second poppet head 125A, 125B coupled to a shaft 135. As illustrated in this example embodiment, the first poppet head 125A engages an external portion of the valve body 120 and the second poppet head 125B engages an internal portion of the valve body 120, within the valve cavity 123.

In various embodiments, it can be beneficial to design respective sealing surfaces of the poppet head 125 and/or valve body 120 so that very little force is required to create sufficient pressure to seal. For example, to minimize sealing force, it can be beneficial in some embodiments for a seal to have minimal surface area in contact with the poppet head 125. In further embodiments, it can be beneficial for pressure of the valve cavity 123 and pressure vessel cavity 123 to cause a seal between the poppet head 125 and/or valve body 120 to deform in a manner that causes the interface to auto-seal or further seal under such pressure.

In some embodiments, this can be achieved by using an O-ring 520 or wiper style seal 530 to mate against the poppet head 125 and/or valve body 120 as illustrated in FIGS. 5b and 5c respectively. Mechanical features can also be used to help constrain a seal in accordance with further embodiments. In various embodiments, a portion of a sealing mechanism can be molded into the valve body 120 or onto a separate part which can then be clamped into place on the valve body 120. In some embodiments, geometry of the poppet head 125 can be chosen so that it interfaces with a sealing mechanism in a controlled and predictable way. This can be desirable in some embodiments because small changes in the exposed area of the poppet head 125 cause large changes in the pressure balance relative to the diaphragm 130.

As illustrated in FIG. 5a, another sealing embodiment comprises a knife edge 510 on the poppet head 125 or valve body 120, which can be configured such that the poppet assembly 106 seals over the smallest possible area possible. This can be beneficial in reducing the required sealing force and controlling both the poppet exposed area and the point where the flow chokes. Material for a knife edge seal can comprise metal-on-metal, metal-on-elastomer, plastic-on-elastomer, or other suitable combinations. In various embodiments, materials may be selected to ensure that the knife edge is not so hard that it damages the opposing surface and vice versa. For example, in various embodiments, the harder the material used to make the knife edge, the faster the seal will damage itself and begin to leak.

Additionally, surface finish and flatness can be important factors that can be of greater significance when dealing with embodiments comprising hard materials. In some embodiments, precision ground surfaces can provide a more effective seal than cast parts due to fewer surface imperfections that allow for leakage paths. Overall flatness can also determine how well two geometries can align to prevent air flow. The poppet head alignment relative to the seal can be a component of minimizing leakage in some embodiments. A variety of mechanical elements can be employed to help constrain the motion of the poppet head 125 such as bushings, flexure bearings, the diaphragm 130, and an actuator that drives it.

In order to allow for fast response times, it can be desirable in some implementations to minimize the imbalance and sealing forces, and also to minimize the moving mass in the valve assembly 105. To minimize the moving mass, some embodiments can use small moving parts, built with lightweight materials. In some embodiments, by choosing an actuator with a small dynamic mass, the inertial forces on the system can be further reduced.

In various embodiments, the valve assembly 105 can be driven by a variety of suitable actuators, which can be because of low force and stroke requirements present in some implementations. For some high-pressure embodiments of the valve assembly 105, travel can be on the order of one millimeter, allowing for many potential actuators to be employed. Solenoids, linear voice coils, motors, piezoelectrics, and the like can be used for valve drivers. In some embodiments, factors that determine which actuators are preferable can include cost, potential for control, moving mass, force, and the like.

The moving mass and peak force of the actuator can be important in various embodiments because when combined with the mass of the poppet assembly 106 this can determine the response time. The response time can define how fast full air flow can be commanded and greater speed can be more desirable in applications that require fast and accurate pressure control.

In various embodiments, heat buildup can be a dominant limitation for some electro-mechanical actuators and an efficient cooling solution can therefore be beneficial in various embodiments to obtain maximum performance from such actuators. For example, in some embodiments, placing heat generating components in a flow path can provide forced convective cooling to occur whenever the actuator is powered up. This can make it possible to use a smaller actuator versus comparable larger valve designs.

Figure 6:
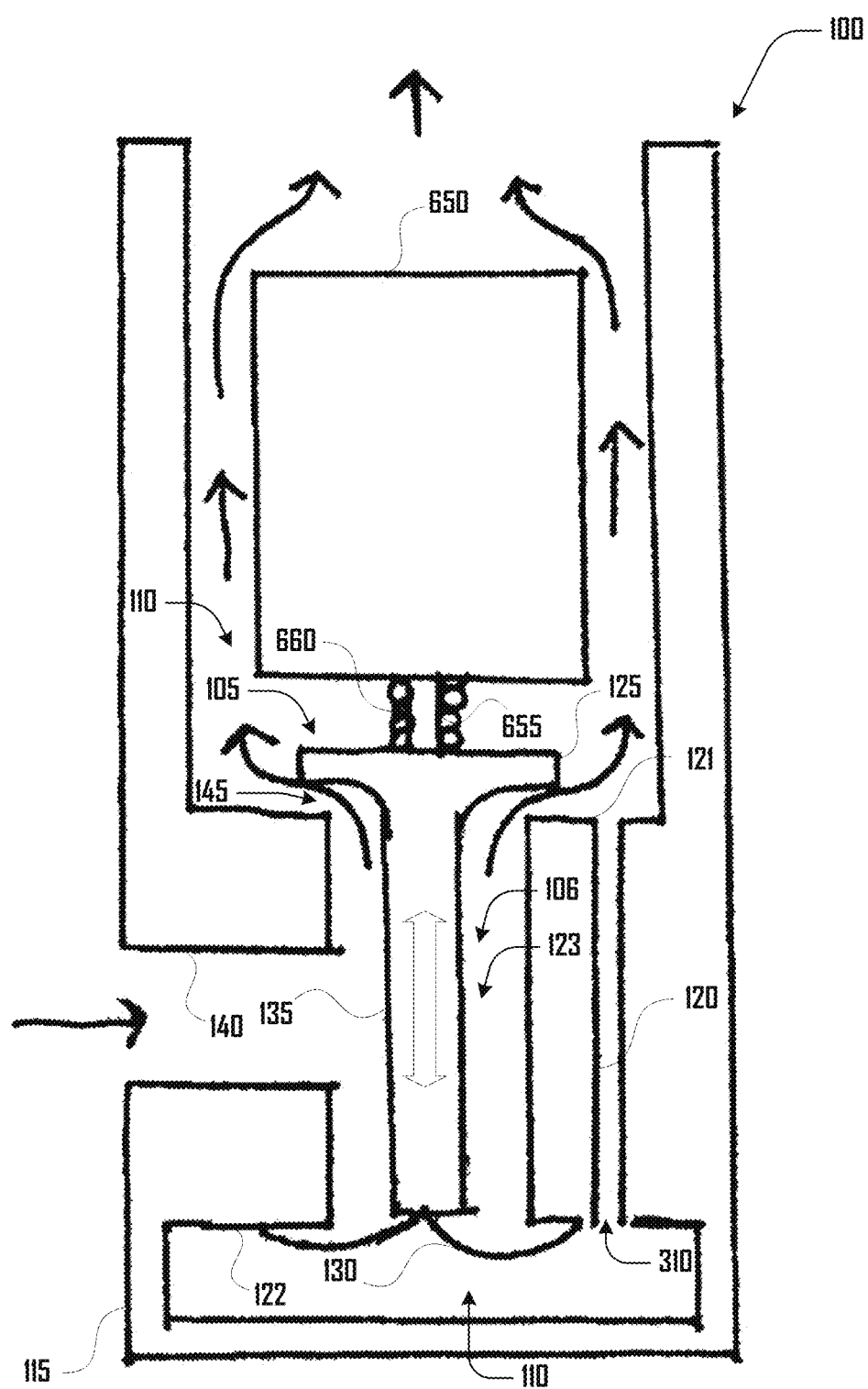
FIG. 6 illustrates and example embodiment where an actuator can be placed in a flow path of the poppet valve system.

For example, FIG. 6 illustrates an example embodiment of a balanced poppet valve system 100 that comprises an actuator 650, that drives a poppet assembly 106 via an actuator shaft 655 coupled to the poppet head 125. In this example, the actuator shaft 655 is surrounded by, and biased with, a spring 660. The poppet assembly 106 comprises the poppet head 125, which communicates with a diaphragm 130 via a poppet shaft 135. The valve assembly 105 is vented via a valve body channel 320 (e.g., as shown in FIG. 3b), but further embodiments can be vented in other suitable ways as discussed herein (e.g., via a poppet channel 310 as shown in FIG. 3a, or the like).

FIG. 6 illustrates and example embodiment where the actuator 650 can be placed in a flow path (shown by single-sided arrows) of the poppet valve system 100, which can provide cooling of actuator the 650. Specifically, fluid can enter the poppet valve system 100 via the channel 140 and into the valve cavity 123, where it can further pass through the opening 145 between the poppet head 125 and the valve body 120. The fluid can pass into the pressurized cavity 110 and flow around and past actuator 650.

Figure 7A:
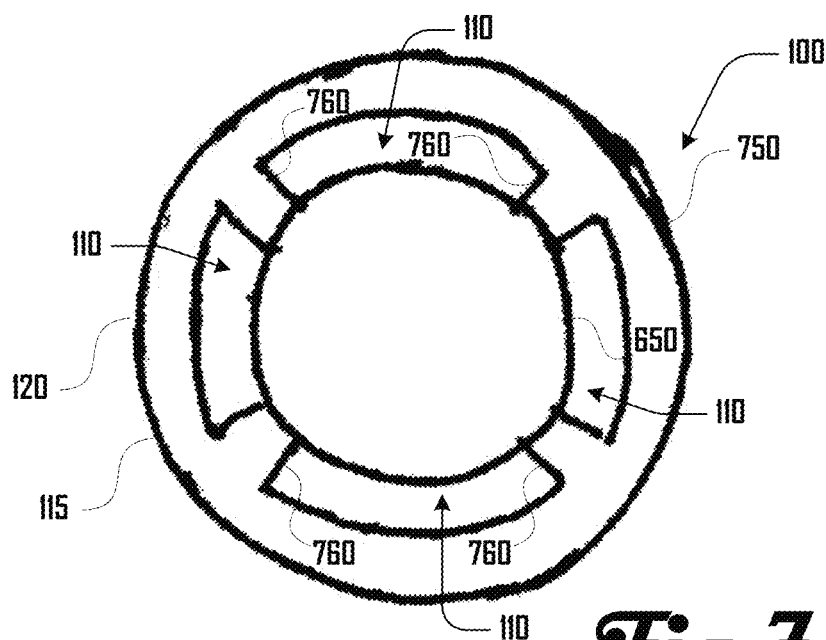
FIG. 7a is a cross sectional top view of another embodiment that can provide cooling to an actuator through cooling fins.

As illustrated in the cross-sectional drawing of FIG. 7a, another embodiment that can provide cooling of an actuator 650 can include a conduction path between the actuator 650 and the outside of valve body 750. For example, this can be done through cooling fins 760 that extend between the actuator 650 and the valve body 120 and/or pressure vessel 115. The cooling fins 760 can extend into the pressure cavity 110 without impeding the flow of fluid about the actuator 650. For example, as shown in FIG. 7a the cooling fins 760 can define four channels in the pressure cavity 110.

The cooling fins 760 can be defined by the valve body 120 and/or pressure vessel 115 in some examples. In other examples, the cooling fins 760 can be defined by a portion of the actuator 650. In further examples, the cooling fins 750 can be separate structures from the actuator 650, valve body 120 or pressure vessel 115.

In some embodiments, the conduction of heat may be improved through the use of high thermal conductivity materials such as aluminum and/or thermally conductive thermoplastics. Additionally, in embodiments where the poppet valve system 100 is fully sealed system, the poppet valve system 100 can be placed a variety of operating environments, irrespective of the ambient pressure (e.g., inside or outside a chamber it is controlling). Such sealed embodiments can be configured to allow valve flow to be run backwards.

Some embodiments of the poppet valve system 100 can comprise a current sensor to monitor the current to the actuator 650. The current, voltage applied, and the properties of the actuator 650 including resistance can then be used to estimate the temperature of the actuator 650. The temperature estimate can be used to trigger cooling procedures including powering off to prevent the actuator 650 from overheating. A temperature measurement can also be done directly by using a thermocouple, thermistor, or the like to measure the temperature of the actuator 650 or other suitable portions of the poppet valve system 100.

One embodiment can comprise a valve assembly 105 wherein some or all of the components of the actuator 650 are surrounded by or are integral to the valve body 120 and/or pressure vessel 115. Building the valve assembly 105 around an actuator 650 can allow for a poppet valve system 100 having a small mass and/or volume, which can be beneficial in some embodiments. Additionally, an actuator 650 having components that define or are a portion of the valve body 120, pressure vessel 115 and/or poppet assembly 106 can allow for further size and weight reduction.

Figure 7B:
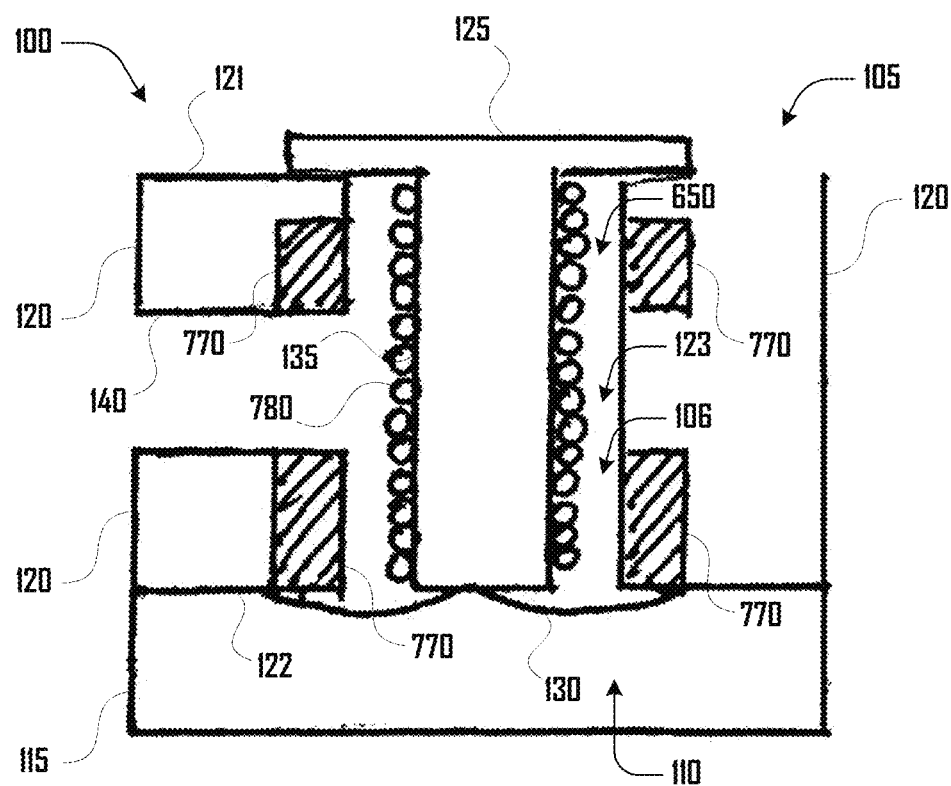
FIG. 7b illustrates an example embodiment wherein an actuator is disposed within the valve cavity and/or defined by portions of a valve body.

For example, FIG. 7b illustrates an example embodiment wherein an actuator is disposed within the valve cavity 123 and/or defined by portions of the valve body 120. In this example, the valve body 120 comprises a plurality of magnets 770 and a voice coil 780 that surrounds the poppet shaft 135. The magnets 770 and voice coil 780 can define at least a portion of an actuator 650 configured to drive the poppet assembly 106 that includes the diaphragm 130, shaft 135 and poppet head 125.

Figure 8:
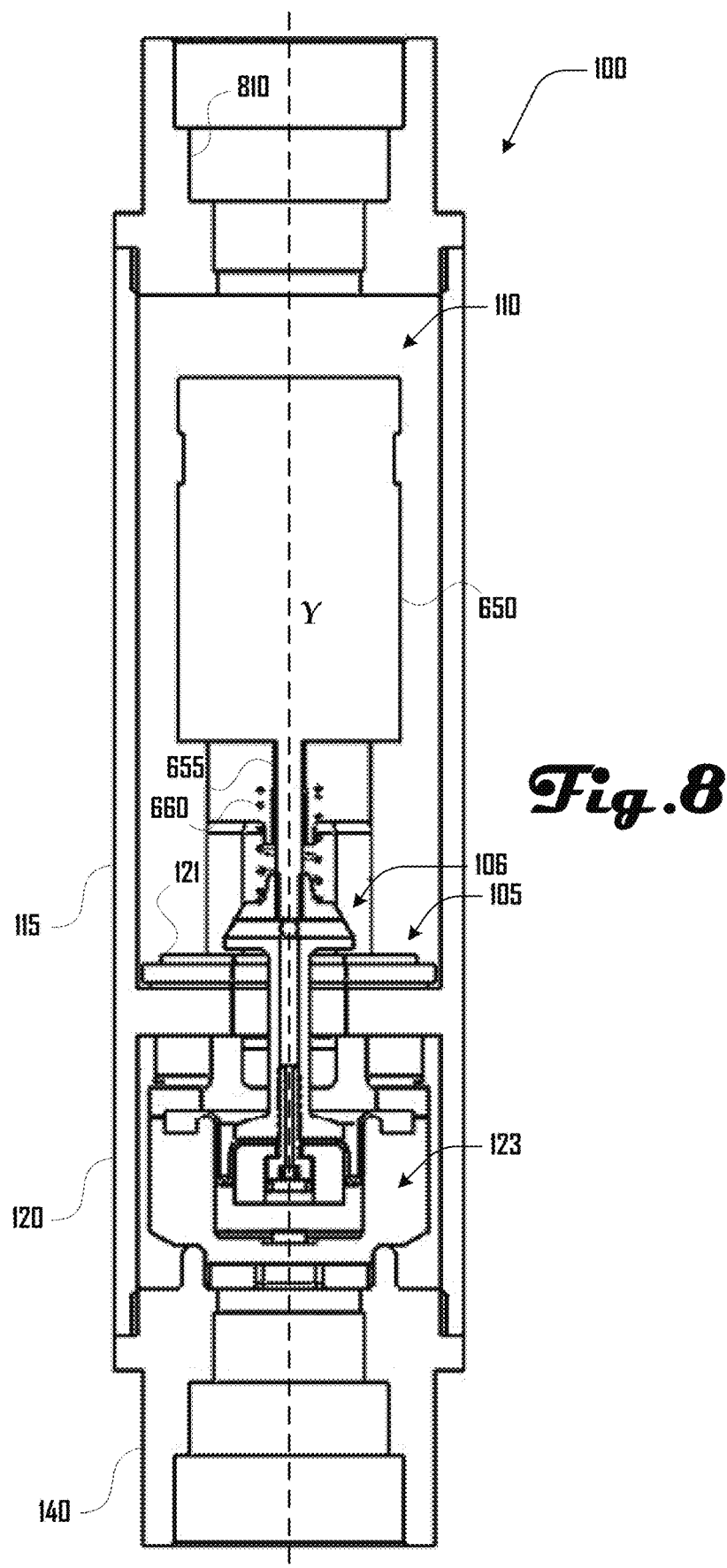
FIG. 8 is a cut-away side view of a poppet valve system whose inlet and outlet ports are placed in-line along a common axis.

In some embodiments, balancing of the forces on the valve assembly 105 can provide for a poppet valve system 100 wherein the actuator 650 only need overcome inertial forces, and the sealing force required to minimize leakage while in a closed state. However, in further embodiments, it can be desirable to install a return spring or flexure that forces the poppet assembly 106 into the closed position when no actuation force is being supplied. This can prevent the valve assembly 105 from leaking in its powered down state and can ensure that if there is a sudden loss of power the valve assembly 105 will fail closed. On the other hand, such a configuration may not be desirable in some embodiments, because such a configuration can require power to hold the valve assembly 105 open. If a return spring is used it can be desirable in some implementations to choose a return spring that has a low spring rate so that the return force does not increase dramatically as the valve assembly 105 moves to the fully open position. An example of an embodiment with a return spring is illustrated in FIG. 8 and discussed in more detail below.

If a spring is not desirable, alternate options may be used to keep the valve assembly 105 shut, such as magnetic latches (using permanent magnets or electromagnets), or over-center, or through biasing the internal balancing forces of the valve, or other mechanical locking mechanisms that would prevent the valve assembly 105 from popping open in the event of a power loss. In addition, materials with adjustable/controllable properties (e.g., nitinol) can be used to actively adjust return rate, locking, or the like. One or more actuator 650 can also be used to drive the valve assembly 105 closed to aid with sealing. This can be done using the same actuator 650 that opens the valve assembly 105 or through the use of an additional actuator 650.

In various embodiments, the poppet valve system 100 can provide proportional control of the air flow which can be achieved by moving the poppet head 125 to different displacements which can change the orifice 145 of valve assembly 105. For some embodiments, this can require the ability to control the position of the valve assembly 105 which can be achieved through both feedforward models and sensor feedback. A return spring can provide a linear force-to-position relationship, so if the actuator 650 can supply a sufficiently accurate range of forces then feedforward control can be adequate for reaching a desired position. If a higher degree of accuracy is required, some embodiments can comprise a position sensor, which can be incorporated into the valve. Such a position sensor can be configured to determine the position of the poppet assembly 106 including the poppet head 125, shaft 135 and/or diaphragm 130. This can be achieved with a variety of sensors including a Hall Effect sensor, optical encoder, eddy current sensor, a displacement sensor, or the like. One or more sensor can be built directly into the various portions of poppet valve system 100 including the valve cavity 123 and/or valve body 120.

In various embodiments, such a poppet valve system 100 can be useful in a variety of fluidic (e.g., pneumatic, hydraulic) applications where it is desirable to control flow rates or pressure. For example, some pneumatic and hydraulic actuation devices operate by controlling the pressure of various chambers which determines the position of their load. For these devices it can be beneficial to control the airflow into the pneumatic actuator as close to the chamber as possible so there is less lag between when a change is commanded and when the pressure is affected. The small size and weight of the balanced poppet valve system 100 of various embodiments described herein can be suited for this purpose because it no longer becomes a burden to have a valve located at each chamber of the actuator.

This can be beneficial in robotics, pneumatic orthotics and exoskeleton-type applications where the weight of numerous valves can add substantially to the weight of the total device, and large valve size can impede mobility. The poppet valve system 100 or valve assembly 105 can also be placed inside a pressure chamber it is controlling in accordance with some embodiments, which can include one or more chamber of an inflatable actuator of an exoskeleton, robot, or the like.

For example, an exoskeleton system (or robotic system) can comprise an actuation system that includes a control system and a fluidic actuation system that can drive a plurality of poppet valve systems 100 disposed within respective inflatable actuators of the exoskeleton. By selectively inflating and/or deflating such inflatable actuators when worn by a user, movements such as walking, lifting, running, or the like can be generated by the exoskeleton.

More specifically, inflating and/or deflating one or more inflatable actuator via one or more poppet valve systems 100 can move joints such as the ankle, knee, elbow, shoulder, wrist, and the like. For example, inflatable actuators and associated poppet valve systems 100 can be worn about or over various joints and can be configured to move such joints of a user. Another example system may be a robotic arm where the valves are used to control the pressure in the joints of the manipulator. Additionally, through the use of coated or molded-in electronics, embodiments of such a valve can be used in a conductive fluid (e.g., used underwater).

In various applications it can be desirable to be able to both increase and decrease a chamber's pressure. Accordingly, in some embodiments and a pair of valves assemblies 105 may be desirable—one to supply high pressure and the other to release pressure. Therefore, in some embodiments, it can be desirable to combine two valves assemblies 105 into a single poppet valve system 100. For example, such a poppet valve system 100 can comprise has three ports 140 and a single actuator 650 that can drive both valve assemblies 105. In some embodiments, this can require a linkage between the two poppet assemblies 106 and the actuator/motor's drive effector that allows the actuator/motor's drive effector to drive the two valves assemblies 105 independently. Further embodiments can utilize levers, flexure mechanisms, or multiple coils sharing a single steel body and magnet to drive the poppet assemblies 106 independently. Example three port, two-way valve embodiment can be expanded to create a multiple port valve that utilizes one or more actuators to control, direct, or regulate flow. In various embodiments, such a valve can be run in either direction (e.g., high pressure and low pressure lines can be switched without changing the functionality), allowing for a consistent mounting scheme for inlet and exhaust valves.

For example, in such an embodiment, a single actuator 650 can actuate a plurality of poppet assemblies 106. Such actuation of the poppet assemblies 106 can occur in unison, can be staggered, can be opposite, or the like. In other words, a single actuator 650 acting on a plurality of poppet assemblies 106 can cause the poppet assemblies 106 to open and close at the same time; to open and close in alternating and/or opposed succession, or the like.

A further embodiment comprises a poppet valve system 100 whose inlet 140 and outlet ports 810 are placed in-line along axis Y, as shown in FIG. 8. This configuration can comprise sealed interior chambers within the poppet valve system 100 that can enable the balanced architecture.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A fluidic device worn on a body of a user, the fluidic device comprising:
    a plurality of inflatable fluidic actuators that define a plurality of pressure cavities, the inflatable fluidic actuators configured to be associated with and move one or more joints by at least inflation of the plurality of inflatable fluidic actuators; and
    a plurality of poppet valve units configured to inflate one or more pressure cavity, the poppet valve units each comprising:
        a valve body having a first and second end and defining a valve cavity; and
        a poppet assembly extending from the first end to the second end and through the valve cavity, the poppet assembly comprising:
            a poppet head disposed at the first end of the poppet assembly and configured to generate a seal by contacting a portion of the valve body and configured to define an opening between the valve cavity and a pressure cavity of an inflatable fluidic actuator; and
            a guiding element coupled at the second end of the valve body, wherein the poppet head and guiding element comprise matching effective cross-sectional areas.

2. A fluidic device worn on a body of a user, the fluidic device comprising:
    a plurality of inflatable fluidic actuators that define a plurality of pressure cavities, the inflatable fluidic actuators configured to be associated with and move one or more joints by at least inflation of the plurality of inflatable fluidic actuators; and
    a plurality of poppet valve units configured to inflate one or more pressure cavity, the poppet valve units each comprising:
        a valve body having a first and second end and defining a valve cavity; and
        a poppet assembly extending from the first end to the second end and through the valve cavity, the poppet assembly comprising:
            a poppet head disposed at the first end of the poppet assembly and configured to generate a seal by contacting a portion of the valve body and configured to define an opening between the valve cavity and a pressure cavity of an inflatable fluidic actuator; and
            a guiding element coupled at the second end of the valve body, wherein a force balance of the poppet assembly is configured to be tuned by changing geometry of at least one of the poppet head and the guiding element.

3. The fluidic device worn on the body of a user of claim 1, wherein the plurality of poppet valve units are configured to inflate, deflate and maintain pressure within the plurality of pressure cavities.

4. The fluidic device worn on the body of a user of claim 1, wherein the inflatable fluidic actuators configured to be associated with one or more joints including one or more of an ankle, knee, elbow, shoulder, or wrist of a human user.

5. The fluidic device worn on the body of a user of claim 1, further comprising an actuator configured to drive the poppet assembly.

6. A poppet valve system comprising:
    a valve body having a first and second end and defining a valve cavity; and
    a poppet assembly extending from the first end to the second end and through the valve cavity, the poppet assembly comprising:
        a movable poppet head disposed at the first end of the poppet assembly and configured generate a seal by contacting a portion of the valve body and configured to define an opening between the valve cavity and a pressure cavity; and
        a movable guiding element disposed at the second end of the valve body, the poppet head and guiding element comprising matching effective cross-sectional areas.

7. The poppet valve system of claim 6, wherein the poppet assembly further comprises a shaft extending from the first end to the second end and coupled to the poppet head and guiding element, and
    wherein the poppet head, guiding element and shaft are configured to move along a common first axis.

8. The poppet valve system of claim 7, further comprising an actuator that includes an actuator drive shaft disposed along the common first axis, the actuator drive shaft coupled to the poppet assembly and configured to drive the poppet assembly along the common first axis.

9. The poppet valve system of claim 8, wherein the actuator is disposed in a fluid flow path defined by the poppet valve system and configured to be cooled by fluid moving in the fluid flow path.

10. The poppet valve system of claim 6, wherein the guiding element comprises a diaphragm.

11. The poppet valve system of claim 6, wherein the poppet assembly is configured such that a valve cavity pressure acting on an inside face of the guiding element and an inside face of the poppet head exerts substantially the same force on the poppet head as the guiding element, which results in a substantially net zero-force on the poppet assembly; and
    wherein an external pressure acting on an external face of the poppet head and on an external face of the guiding element exerts substantially the same force on the poppet assembly in opposite directions to result in a substantially net-zero force.

12. The poppet valve system of claim 6, wherein a force balance of the poppet assembly is configured to be tuned by changing geometry of at least one of the poppet head and the guiding element.

13. The poppet valve system of claim 6, further comprising a vent that extends from the first end to the second end and configured to operably connect a separate first and second portion of the pressure cavity.

14. The poppet valve system of claim 6, wherein the poppet head defines a poppet channel that extends between a first poppet head end and a second poppet head end, the poppet channel providing venting between the first and second end of the valve body.

15. The poppet valve system of claim 6, wherein the poppet assembly comprises a return spring configured to force the poppet assembly into a closed position when an actuation force is not applied to the poppet assembly.

16. The poppet valve system of claim 6, wherein the valve body defines a plurality of ports, and wherein the poppet valve system is configured to control, direct and regulate two-way fluid flow via the plurality of ports.

17. The poppet valve system of claim 6, wherein the valve body defines a plurality of ports, and wherein the poppet valve system is configured to selectively direct fluid flow between the plurality of ports.

18. The poppet valve system of claim 6, wherein a poppet valve system comprises a plurality of poppet assemblies, and wherein the plurality of poppet assemblies are driven by a single actuator.

19. The poppet valve system of claim 6, wherein the pressure cavity is defined at least in part by an inflatable fluidic actuator; and wherein the inflatable fluidic actuator is part of a fluidic robot with the inflatable fluidic actuator positioned about a joint and configured to move the joint when the inflatable fluidic actuator is inflated by the poppet valve system.

* * * * *